United States Patent Office 3,627,474
Patented Dec. 14, 1971

3,627,474
PROCESS FOR THE COLORATION OF CELLULOSE TEXTILE MATERIAL WITH FIBER REACTIVE DYESTUFFS
Dennis Eckersley, Terence David Flynn, and Irwin Seltzer, Manchester, England, assignors to Imperial Chemical Industries Limited, London, England
No Drawing. Continuation-in-part of abandoned application Ser. No. 590,220, Oct. 28, 1966. This application Nov. 7, 1969, Ser. No. 874,975
Claims priority, application Great Britain, Nov. 5, 1965, 47,009/65
Int. Cl. D06p 3/66
U.S. Cl. 8—25                                3 Claims

ABSTRACT OF THE DISCLOSURE

Process for the coloration of cellulose textile material wherein the material is treated with a first chloro-s-triazine group containing reactive dyestuff to introduce primary amino groups chemically linked to the cellulose molecule and is then subjected to the action of an aqueous medium containing a second reactive dyestuff.

---

This application is a continuation-in-part of application Ser. No. 590,220, filed Oct. 28, 1966, now abandoned.

This invention relates to a new and improved process for the colouration of cellulose textile materials with reactive dyes.

The term "reactive dye" as used herein is intended to refer to a coloured compound which is capable of entering into chemical reaction with the cellulose molecule in an aqueous medium in the presence of an alkaline agent. A large number of such dyes are commercially available or have been described in the literature.

A disadvantage arising from the use of reactive dyes in processes described hitherto lies in the fact that the reaction with the cellulose molecule is accompanied by a side-reaction with water whereby a proportion of the dyestuff becomes incapable of reaction with the cellulose molecule. This is particularly the case where a relatively high concentration of dyestuff is used to obtain heavy shades, more particularly where a mixture of dyes is used to obtain tertiary shades such as dark browns, olives, greys and blacks.

It has now been found that improved fixation of the dyestuff can be obtained if the cellulose molecule is first chemically modified so as to introduce primary amino groups.

Thus according to the present invention there is provided a process for the colouration of cellulose textile material wherein the material is treated with a coloured chloro-s-triazine compound to introduce primary amino groups chemically linked to the cellulose molecule and is then subjected to the action of an aqueous medium containing a reactive dyestuff.

The coloured chloro-s-triazine compound which is used to introduce primary amino groups chemically linked to the cellulose molecule and also the reactive dyestuff which is subsequently applied to the cellulose textile material so treated may belong to any chromophoric system, for example, they may be of the azo, anthraquinone, phthalocyanine or nitrodiphenylamine series.

The chemical modification of the cellulose molecule to introduce amino groups can conveniently be carried out by treatment of the cellulose with a chloro-s-triazine compound containing an aromatic nucleus bearing a sulphamic acid group in the form of its alkali metal salt, fixing the compound in the cellulose molecule by treatment with an acid-binding agent, and thereafter treating the cellulose material with dilute acid whereby the $NHSO_3H$ groups are converted to $NH_2$ groups.

The treated textile material can then be coloured by the usual procedures adapted for application of reactive dyestuffs or, if desired, colourations can also be effected by treatment with an aqueous solution of the dyestuff without the usual co-use of an alkaline agent to fix the reactive dyestuff on the fibre.

By the use of coloured compounds for introduction of the amino groups, extremely deep shades are possible owing to the cumulative effect of the second dye on the already coloured fibre.

The invention is illustrated but not limited by the following examples in which parts and percentages are by weight:

EXAMPLE 1

100 parts of mercerised cotton yarn are immersed in a solution of 5 parts of the copper complex of the compound of the formula:

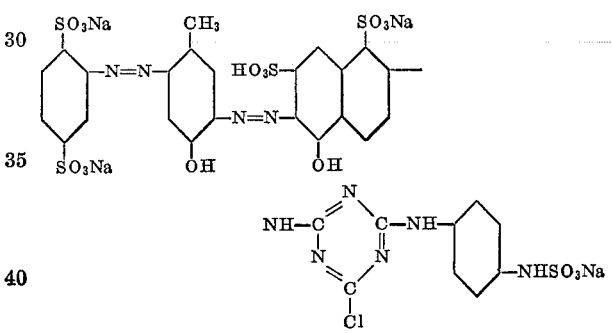

in 1500 parts of water. The solution is heated to 80° C., and 75 parts of sodium chloride are added. After 10 minutes, a further 75 parts of sodium chloride are added. After a further 10 minutes, 30 parts of sodium carbonate are added and the treatment is continued for a further 40 minutes.

The yarn is removed from the solution, rinsed in water and washed at the boil in a 0.2% solution of a detergent for 5 minutes, then treated for 5 minutes at the boil in a 0.4% solution of hydrochloric acid. The yarn is then rinsed in water, treated for 5 minutes at 80° C. in a 1% solution of sodium bicarbonate to remove residual acid and then dyed for 60 minutes in a 15:1 liquor-to-goods ratio dyebath using 5 parts of the dyestuff of Example 1 of U.S. patent specification No. 1,667,312, the dyebath also containing 50 grams/litre of sodium chloride and 2 grams/litre of a buffer (sodium dihydrogen phosphate).

The yarn is removed from the bath, rinsed in water and washed for 10 minutes at the boil in a 0.2% solution of detergent. A very deep purple dyeing is obtained.

If the dyeing with the dyestuff of Example 1 of U.S.

patent specification No. 1,667,312 is performed using a bath containing 50 grams/litre of sodium chloride for 20 minutes, then adding 10 grams/litre of sodium carbonate and dyeing for a further 40 minutes, a deeper, redder dyeing is obtained.

The dyestuff having the above formula is prepared by stirring a solution of 20.6 parts of the corresponding dichlorotriazinyl dyestuff (prepared as described in Example 17 of U.S. patent specification No. 3,038,893) in 600 parts of water at 20° C. and pH 6–7, and adding a neutral solution of 4.34 parts of p-aminophenylsulphamic acid in 50 parts of water. The reaction mixture is stirred at 35–40° C. for 3 hours whilst the pH is maintained at 6–7 by the gradual addition of 2 N-sodium carbonate solution. The reaction mixture is allowed to stir and cool to room temperature, 195 parts of sodium chloride are added and the mixture is stirred for 1 hour. The precipitated dyestuff is filtered off, washed on the filter with a solution of 60 parts of sodium chloride in 200 parts of water and is finally dried at 25° C. in vacuo.

The product is found on analysis to contain 0.95 atom of reactive chlorine per molecule of dyestuff.

EXAMPLE 2

The procedure described in Example 1 is repeated except that in place of the treatment with the copper complex compound there is used a solution containing 5 parts of the compound of the formula:

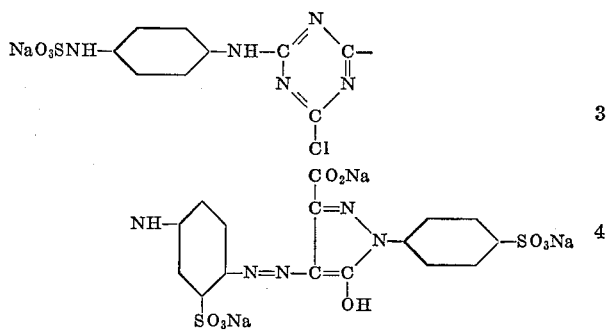

and two portions of 150 parts of sodium chloride are added.

Deep bright red dyeings are obtained, that using sodium carbonate in the second treatment being deeper.

The dyestuff having the above formula is prepared by stirring a solution of 16.9 parts of the corresponding dichlorotriazinyl dyestuff (prepared as in Example 3 of U.S. patent specification No. 2,892,831) in 500 parts of water at 20° C. and pH 6–7, adding a neutral solution of 5.4 parts of p-aminophenylsulphamic acid in 65 parts of water and heating the mixture at 35–40° C. and pH 6–7 for 3 hours. The product was precipitated and isolated as in Example 1. The product on analysis was found to contain 0.95 atom of reactive chlorine per molecule of dyestuff.

EXAMPLE 3

100 parts of cotton limbric are immersed in a solution of 40 parts of the dyestuff used in Example 2, 20 parts of sodium carbonate and 200 parts of urea per 1000 parts of water at room temperature and is then squeezed between rollers to a total weight of 200 parts. The impregnated fabric is dried in warm air and then heated to a temperature of 140° C. for 3 minutes.

The fabric is rinsed in water and washed at the boil in a 0.2% solution of detergent for 5 minutes, then treated at the boil in a 0.4% solution of hydrochloric acid. The fabric is then rinsed in water, treated for 5 minutes at 80° C. in a 1% solution of sodium bicarbonate to remove residual acid and dried.

The fabric is then immersed in a neutral solution of 20 parts of the dyestuff described in Example 1 of U.S. patent specification No. 1,667,312 and 2 parts of a wetting agent in 1000 parts of water, squeezed between rollers to a total weight of 200 parts and stored for two hours at room temperature. The fabric is rinsed in water, washed at the boil in a 0.2% solution of detergent for 5 minutes and then dried. A fast scarlet shade is obtained.

EXAMPLE 4

100 parts of cotton limbric are immersed in a solution of 20 parts of the dyestuff of the formula:

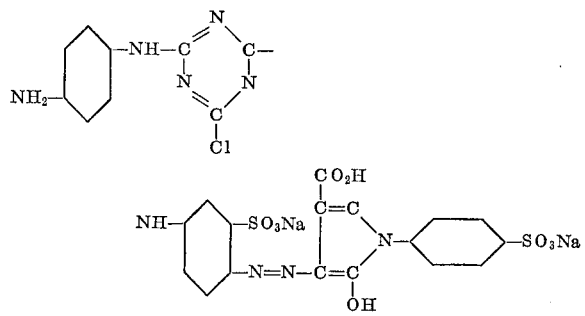

10 parts of sodium carbonate and 2 parts of a wetting agent per 1000 parts of water and is then squeezed between rollers to a total weight of 200 parts. The impregnated fabric is dried in hot air, steamed at 100° C. for 3 minutes, rinsed in cold water and then washed at the boil in a 0.2% solution of detergent for 5 minutes.

The fabric is then immersed in a neutral solution of 20 parts of the dyestuff described in Example 1 of U.S. patent specification No. 1,667,312 per 1000 parts of water for 10 minutes at 40° C., rinsed in cold water, washed at the boil in a 0.2% solution of detergent for 5 minutes and then dried. A fast scarlet shade is obtained.

The dyestuff having the above formula is prepared by dissolving 10 parts of the dyestuff having the formula disclosed in Example 2 in 300 parts of 0.4% hydrochloric acid, heating the solution at the boil for 3–4 minutes, quickly cooling the solution and isolating the dyestuff compound by the addition of 15 parts of sodium chloride. The precipitated product is filtered off, washed on the filter with 100 parts of 5% brine and dried.

EXAMPLE 5

The procedure described in Example 3 is followed except that a copper complex of a compound of the formula:

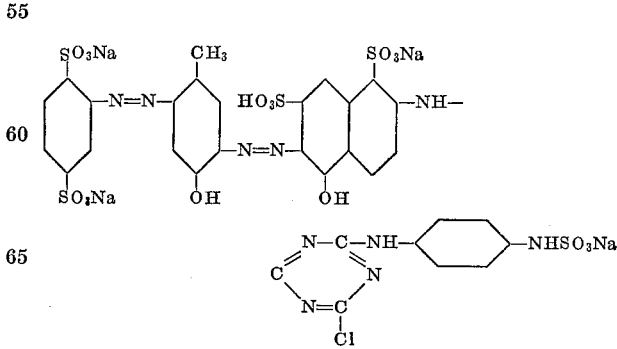

is used in the first stage of the colouration process, whereupon a deep purple shade is obtained. The preparation of the dyestuff compound of the above formula is described in Example 1.

EXAMPLE 6

100 parts of bleached unmercerised cotton fabric are immersed in a solution of 20 parts of the dyestuff of the formula:

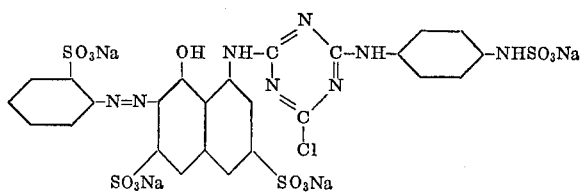

20 parts of sodium carbonate, 200 parts of urea and 5 parts of a wetting agent per 1000 parts of water and is then squeezed between rollers to a total weight of 200 parts.

The impregnated fabric is dried in hot air, baked at 120° C. for 5 minutes, rinsed in cold water and washed at the boil in a 0.2% solution of detergent for 5 minutes, then treated at the boil in a 0.4% solution of hydrochloric acid. The fabric is then rinsed in water, treated for 5 minutes at 80° C. in a 1% solution of sodium bicarbonate to remove residual acid and then dried.

The fabric is then immersed in a neutral solution of 20 parts of the dyestuff of Example 4 of U.S. patent specification No. 2,892,831 and 60 parts of sodium chloride per 2000 parts of water for 90 minutes at 40° C., rinsed in cold water, washed at the boil in a 0.2% solution of detergent for 5 minutes and then dried.

A fast scarlet shade is obtained.

The dyestuff having the above formula is prepared by stirring a solution of 47.8 parts of the corresponding dichlorotriazinyl dyestuff (prepared as in Example 1 of U.S. patent specification No. 2,892,829) in 600 parts of water at 20° C. and pH 6–7, adding a neutral solution of 18.0 parts of p-aminophenyl sulphamic acid in 180 parts of water and heating the mixture at 35–40° C. and pH 6–7 for 3 hours. The product was precipitated and isolated as in Example 1. On analysis, the product was found to contain 1.0 atom of reactive chlorine per molecule of dyestuff.

EXAMPLE 7

Plain weave mercerised cotton fabric is treated as described in the first and second paragraphs of Example 3. The fabric is then printed with a composition containing

|  | Parts |
| --- | --- |
| Dyestuff described in Example 1 of U.S. patent specification No. 1,667,312 | 4 |
| Urea | 10 |
| Sodium alginate (4% solution) | 35 |
| m-Nitrobenzene sulphonic acid sodium salt | 1 |
| Water | 50 |
|  | 100 |

The printed fabric is allowed to dry at room temperature for 1 hour and subsequently rinsed in water and treated in a 0.2% solution of a detergent at the boil for 5 minutes, rinsed in water and finally dried.

A scarlet print on a golden yellow ground shade is obtained, both colours having good fastness.

EXAMPLE 8

The procedure of Example 7 is repeated except that drying after printing is carried out in a hot air stove at 60° C. for 3 minutes.

Similar results are obtained.

Alternatively fixation may be carried out by cylinder drying with a contact time of 1 minute at 105° C., steaming at 100° C. for at least 20 seconds or steaming in superheated steam at 150° C. for at least 5 seconds.

EXAMPLE 9

A neutral solution of 42.3 parts of the trisodium salt of a technical mixture of 1-amino-4-(4'-aminoanilino)-anthraquinone-2,3',5- and 8-trisulphonic acids in 650 parts of water is added during 20 minutes at pH 4–5, and a temperature of 0–5° C. to a stirred suspension of 13.53 parts of cyanuric chloride in 60 parts of acetone and 100 parts of water. The reaction mixture is stirred for a further 15 minutes and screened. The filtrates are stirred at pH 6–7, a neutral solution of 18.0 parts of p-aminophenylsulphamic acid in 60 parts of water is added and the reaction mixture is stirred at 20–25° C. and pH 6–7 for 1 hour. 280 parts of sodium chloride are added, the mixture is stirred for 15 minutes, the precipitated dyestuff is filtered off, washed on the filter with 250 parts of 25% w./v. sodium chloride solution and is finally dried in vacuo at 20° C.

The dyestuff so obtained has the structure

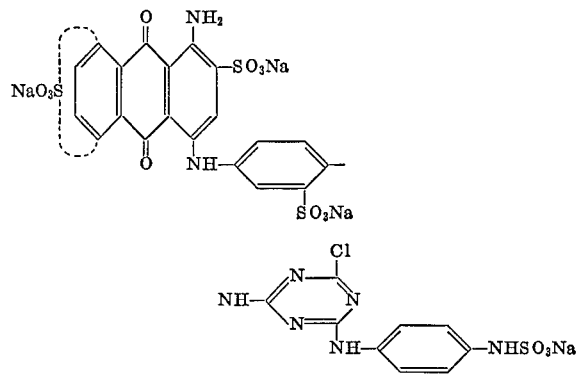

and is found on analysis to contain 1.0 atom of hydrolysable chlorine per molecule of dyestuff.

50 parts of mercerised cotton yarn are immersed in a solution of 4.0 parts of the above dyestuff compound in 1500 parts of water. The solution is heated to 80° C. and 75 parts of sodium chloride are added. After 15 minutes 30 parts of sodium carbonate are added and the treatment is continued for 1 hour.

The yarn is removed from the solution, rinsed in water and washed at the boil in a 0.2% solution of a detergent for 5 minutes, then treated at the boil for 5 minutes in a 0.4% solution of hydrochloric acid. The yarn is then rinsed in water, treated for 5 minutes at the boil in a 1.0% solution of sodium bicarbonate to remove residual acid and then dyed for 45 minutes in a 30:1 liquor-to-goods ratio dyebath using 4 parts of the dyestuff of Example 3 of U.S. patent specification No. 2,892,831, the dyebath also containing 50 parts/litre of sodium chloride and 2 parts/litre of sodium dihydrogen phosphate.

The yarn is removed from the bath, rinsed in water and washed for 10 minutes at the boil in a 0.2% solution of detergent. A deep greenish-olive dyeing is obtained.

EXAMPLE 10

If in place of the 4.0 parts of the compound having the structure given in Example 9, there are used 4.0 parts of the dyestuff of formula

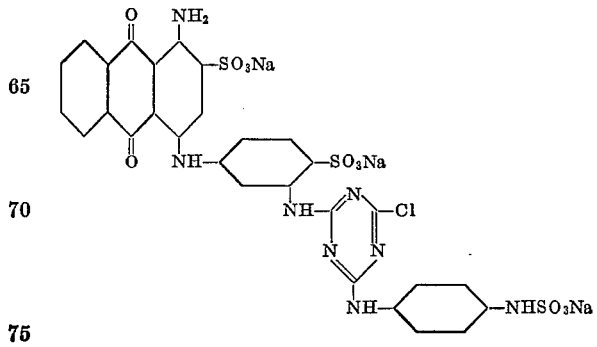

(which is prepared by condensation of 13.6 parts of the corresponding dichlorotriazinyl dye of Example 8 of U.S. patent specification No. 3,125,564 with 4.5 parts of p-aminophenylsulphamic acid exactly as described in the previous examples) the resultant dyeings are deep olive.

EXAMPLE 11

The dichlorotriazinylamino-phthalocyanine dyestuff prepared as described in Example 1 of U.S. patent specification No. 3,133,059 was condensed with 16.0 parts of p-aminophenylsulphamic acid as described in Example 1 of this specification to give the corresponding dyestuff in which one chlorine atom on the triazine ring is replaced by the p-(sulphoamino)phenylamino group. The product on analysis was found to contain 1.5 atoms of hydrolysable chlorine per molecule of dyestuff.

100 parts of bleached unmercerised cotton fabric are immersed in a solution of 20 parts of the above sulphamic acid group-containing dyestuff, 20 parts of sodium carbonate and 200 parts of urea in 1000 parts of water and is then squeezed between rollers to a total weight of 200 parts.

The fabric is dried in hot air, baked at 120° C. for 5 minutes, rinsed in cold water and washed at the boil in a 0.2% solution of detergent for 5 minutes, then treated at the boil in a 0.4% solution of hydrochloric acid. The fabric is then rinsed in water, treated for 5 minutes at 80° C. in a 1% solution of sodium bicarbonate to remove residual acid and then dried.

The fabric is then immersed in a neutral solution of 20 parts of the dyestuff of Example 3 of U.S. patent specification No. 2,892,831 and 50 parts of sodium chloride in 2000 parts of water at 40° C. for 90 minutes, rinsed in water, washed at the boil in a 0.2% solution of detergent for 5 minutes and then dried.

A deep green shade is obtained.

EXAMPLE 12

100 parts of bleached unmercerised cotton fabric are immersed in a solution of 10 parts of the dyestuff of the formula:

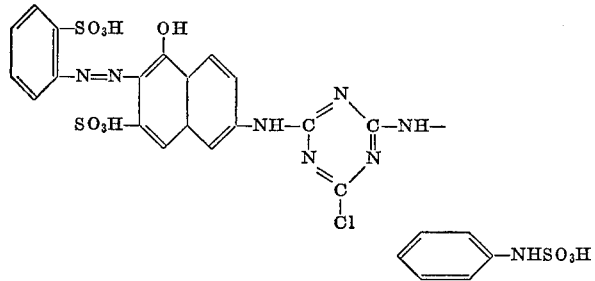

(which is prepared by condensation of 57.1 parts of the corresponding dichlorotriazinyl dye of Example 1 of U.S. patent specification No. 2,892,828 with 19.5 parts of p-amino phenylsulphamic acid by the method of Example 1 of this specification), 15 parts of sodium carbonate, 100 parts of urea and 2.5 parts of a wetting agent in 1000 parts of water and is then squeezed between rollers to a total weight of 200 parts.

The impregnated fabric is dried in hot air, baked at 120° C. for 5 minutes, rinsed in cold water and washed at the boil in a 0.2% solution of detergent for 5 minutes, then treated at the boil in a 0.4% solution of hydrochloric acid. The fabric is then rinsed in water, treated for 5 minutes at 80° C. in a 1% solution of sodium bicarbonate to remove residual acid and then dried.

The fabric is then immersed in a neutral solution of 10 parts of the dyestuff of Example 8 of U.S. patent specification No. 3,125,564 and 100 parts of sodium chloride per 1000 parts of water for 90 minutes at 40° C., rinsed in cold water, washed at the boil in a 0.2% solution of detergent for 5 minutes and then dried.

A very deep brown dyeing is obtained.

EXAMPLE 13

100 parts of bleached unmercerised cotton fabric are immersed in a solution of 20 parts of the dyestuff of the formula:

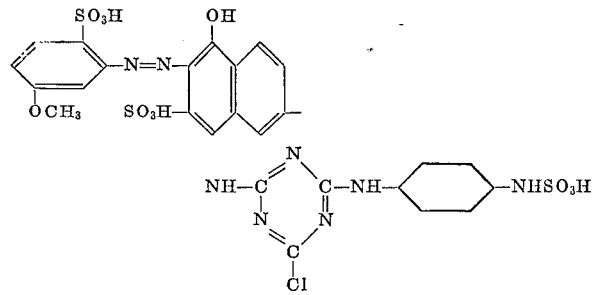

(which is prepared by the condensation of 60.1 parts of the correponding dichlorotriazinyl dyestuff of Example 1 of U.S. patent specification No. 2,892,828 with 19.5 parts of p-aminophenylsulphamic acid by the method of Example 1 of this specification), 20 parts of sodium carbonate, 150 parts of urea and 2.0 parts of a wetting agent in 1000 parts of water and is then squeezed between rollers to a total weight of 200 parts.

The impregnated fabric is dried in hot air, baked at 120° C. for 5 minutes, rinsed in cold water and washed at the boil in a 0.2% solution of detergent for 5 minutes, then treated at the boil in a 0.4% solution of hydrochloric acid. The fabric is then rinsed in water, treated for 5 minutes at 80° C. in a 1% solution of sodium bicarbonate to remove residual acid and then dried.

The fabric is then immersed in a neutral solution of 10 parts of the dyestuff of Example 1 of U.S. patent specification No. 2,892.830 and 150 parts of sodium chloride per 1000 parts of water for 90 minutes at 40° C., rinsed in cold water, washed at the boil in a 0.2% solution of detergent for 5 minutes and then dried.

A fast orange shade is obtained.

EXAMPLE 14

100 part of mercerised cotton yarn are immersed in a solution of 5.0 parts of the chromium complex of the dyestuff of the formula:

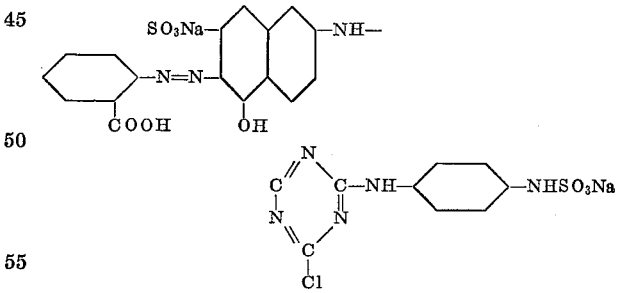

(prepared by the condensation of 60.0 parts of the corresponding dichlorotriazinyl dyestuff (see below) with 22.5 parts of p-aminophenylsulphamic acid by the method of Example 1 of this specification), in 1000 parts of water. The solution is heated to 80° C. and 50 parts of sodium chloride are added. After 10 minutes a further 50 parts of sodium chloride are added. After a further 10 minutes. 30 parts of sodium carbonate are added and the treatment is continued for 40 minutes longer.

The yarn is removed from the solution, rinsed in water and washed at the boil in a 0.2% solution of a detergent for 5 minutes, then treated for 5 minutes at the boil in a 0.4% solution of hydrochloric acid. The yarn is then rinsed in water, treated for 5 minutes at 80° C. in a 1% solution of sodium bicarbonate to remove residual acid and then dyed for 60 minutes in a 15:1 liquor to goods ratio dyebath using 5.0 parts of the same dichlorotriazinyl dyestuff as was used for condensation with p-aminophenylsulphamic acid in the first part of this example, the dyebath also containing 50 parts/litre of sodium chloride and 2 parts/litre of a buffer (sodium dihydrogen phosphate). The yarn is removed from the dyebath, rinsed in water and washed for 10 minutes at the boil in a 0.2% solution of detergent.

A very deep reddish brown dyeing is obtained.

The dichlorotriazinyl dyestuff which is condensed with p-aminophenylsulphamic acid to give the dyestuff having the structure given in the first paragraph of this example is prepared as follows:

A mixture of 10.8 parts of the disodium salt of 2-amino-6-(2'-carboxyphenylazo)-5-naphthol-7-sulphonic acid, 4.9 parts of chromium triacetate and 200 parts of water is stirred at the boil under a reflux condenser for 3 hours. The solution so obtained is cooled to 10° C., made acid to Congo red by the addition of a concentrated aqueous solution of hydrochloric acid and the 1:2-chromium complex of 2 - amino - 6-(2'-carboxyphenylazo)-5-nahthol-7-sulphonic acid which separates out is filtered off and dried. A solution of the chromium complex in 100 parts of water is treated with sodium carbonate until the pH of the solution is 7.4 and the solution so obtained is added to a solution of 4.6 parts of cyanuric chloride in 100 parts of acetone. The mixture is then stirred for 3 hours at a temperature between 0° and 5° C. and a 10% aqueous solution of sodium carbonate is added, at intervals, to maintain the pH of the mixture at 7. 6.4 parts of sodium dihydrogen phosphate, 3.6 parts of disodium hydrogen phosphate and 10 parts of sodium chloride are then added and the dyestuff which separates out is filtered off. mixed with 0.7 part of disodium hydrogen phosphate and 1.3 parts of sodium dihydrogen phosphate and dried.

On analysis the dyestuff composition so obtained is found to contain 1 atom of chromium and 4.0 atoms of organically bound chlorine per molecule of dyestuff.

EXAMPLE 15

100 parts of bleached unmercerised cotton fabric are immersed in a solution of 10 parts of the dyestuff of the formula

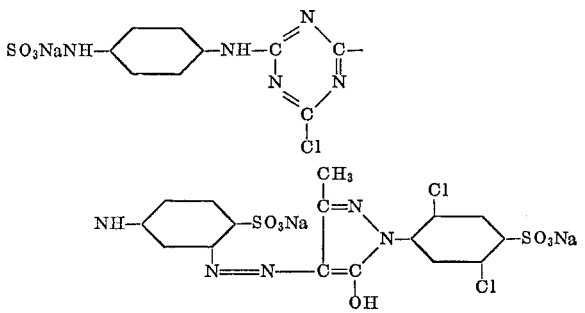

(prepared by the condensation of 71.4 parts of the corresponding dichlorotriazinyl dyestuff of Example 4 of U.S. patent specification No. 2,892,831, with 20.0 parts of p-aminophenylsulphamic acid by the method of Example 1 of this specification). 15 parts of sodium carbonate, 100 parts of urea and 2.5 parts of a wetting agent in 1000 parts of water and is then squeezed between rollers to a total weight of 200 parts.

The impregnated fabric is dried in hot air, baked at 120° C. for 5 minutes, rinsed in cold water and washed at the boil in a 0.2% solution of detergent for 5 minutes, then treated at the boil in a 0.4% solution of hydrochloric acid. The fabric is then rinsed in water, treated for 5 minutes at 80° C. in a 1% solution of sodium bicarbonate to remove residual acid and then dried. The fabric is then immersed in a neutral solution of 10 parts of the dyestuff of Example 4 of U.S. patent specification No. 2,892,831, and 100 parts of sodium chloride per 1000 parts of water for 90 minutes at 40° C., rinsed in cold water, washed at the boil in a 0.2% solution of detergent for 5 minutes and then dried.

A very deep greenish yellow dyeing is obtained.

EXAMPLE 16

By substitution of 10 parts of the dichlorotriazinyl dyestuff described in Example 8 of U.S. patent specification No. 3,125,564 for the 10 parts of the dyestuff of Example 4 of U.S. patent specification No. 2,892,831 used in Example 15, a very deep olive green dyeing is obtained.

EXAMPLE 17

By substitution of 10 parts of the dichlorotriazinyl dyestuff prepared as described in Example 1 of U.S. patent specification No. 3,133,059 for the 10 parts of the dyestuff of Example 4 of U.S. patent specification No. 2,892,831 used in Example 15, a very bright, deep yellowish-green dyeing is obtained.

EXAMPLE 18

100 parts of mercerised cotton yarn are immersed in a solution of 10 parts of the copper complex of the dyestuff of the formula:

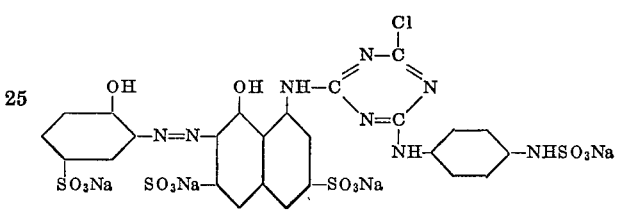

(prepared by the condensation of the corresponding dichlorotriazinyl dyestuff of Example 1 of U.S. patent specification No. 3,157,630 with an equimolar amount of p-aminophenylsulphamic acid as described in Example 1 of this specification) in 1000 parts of water. The solution is heated to 80° C. and 100 parts of sodium chloride are added during 15 minutes. After a further 15 minutes 30 parts of sodium carbonate are added and the heating at 80° C. is continued for a further 45 minutes.

The yarn is removed from the solution, rinsed in water and washed at the boil in a 0.2% solution of a detergent for 5 minutes, then treated for 5 minutes at the boil in a 0.4% solution of hydrochloric acid. The yarn is then rinsed in water, treated for 5 minutes at 80° C. in a 1% solution of sodium bicarbonate to remove residual acid and then dyed for 60 minutes in a 15:1 liquor to goods ratio dyebath using 10.0 parts of the dyestuff of Example 1 of U.S. patent specification No. 2,892,828, the dyebath also containing 50 parts/litre of sodium chloride and 2 parts/litre of a buffer (sodium dihydrogen phosphate).

The yarn is removed from the dyebath, rinsed in water and washed for 10 minutes at the boil in a 0.2% solution of detergent.

A deep reddish-brown dyeing is obtained.

EXAMPLE 19

By substitution of 10 parts of the copper complex of the dyestuff of the formula:

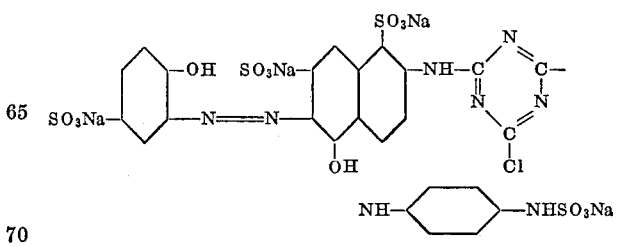

(prepared by the condensation of the corresponding dichlorotriazinyl dyestuff of Example 23 of U.S. patent specification No. 3,157,630 with an equimolar amount of p-aminophenylsulphamic acid as described in Example 1 of this specification) for the 10 parts of the copper complex of the dyestuff of the formula:

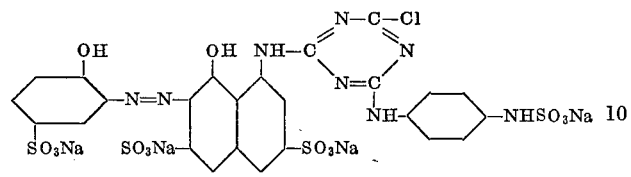

used in Example 18, a deep reddish-brown dyeing is obtained.

EXAMPLE 20

Unmercerised cotton fabric is treated as described in the first and second paragraphs of Example 12. The fabric is then printed with a composition containing

| | Parts |
|---|---|
| Dyestuff described in Example 8 of U.S. patent specification No. 3,125,564 | 4 |
| Urea | 10 |
| Sodium alginate (4% solution) | 35 |
| m-Nitrobenzene sulphonic acid sodium salt | 1 |
| Water | 50 |
| | 100 |

The printed fabric is allowed to dry at room temperature for 1 hour and is subsequently rinsed in water and treated in 0.2% solution of a detergent at the boil for 5 minutes rinsed in water and finally dried.

A brown print on a bright orange ground shade is obtained, both colours possessing good wet fastness properties.

EXAMPLE 21

If in Example 20 the 4 parts of the dyestuff described in Example 8 of U.S. patent specification No. 3,125,564, are replaced by 4 parts of the dyestuff described in Example 1 of U.S. patent specification No. 1,667,312, a scarlet print on a bright orange ground shade is obtained which has good wet fastness properties.

EXAMPLE 22

100 parts of cotton limbric are immersed in a solution of 20 parts of the dyestuff of the formula:

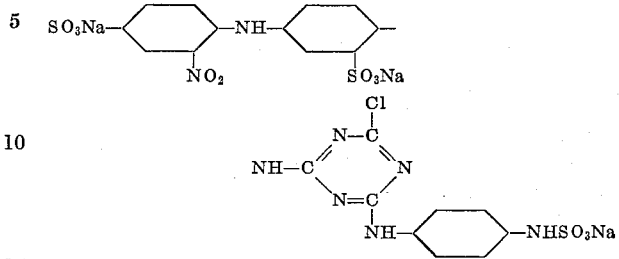

(prepared by the condensation of the corresponding dichlorotriazinylamino dyestuff described in Example 1 of U.S. patent specification No. 3,054,793 with an equimolar amount of p-aminophenylsulphamic acid as described in Example 1 of this specification) 20 parts of sodium carbonate and 100 parts of urea per 1000 parts of water at room temperature and is then squeezed between rollers to a total weight of 200 parts. The impregnated fabric is dried in warm air and then heated to a temperature of 140° C. for 3 minutes.

The fabric is rinsed in water and washed at the boil in a 0.2% solution of detergent for 5 minutes, then treated at the boil in 0.4% solution of hydrochloric acid. The fabric is then rinsed in water, treated for 5 minutes at 80° C. in a 1% solution of sodium bicarbonate to remove residual acid and dried.

The fabric is then immersed in a neutral solution of 20 parts of the dyestuff described in Example 1 of U.S. patent specification No. 2,892,829 and 2 parts of a wetting agent in 1000 parts of water, squeezed between rollers to a total weight of 200 parts and stored for 2 hours at room temperature. The fabric is rinsed in water, washed at the boil in a 0.2% solution of detergent for 5 minutes and then dried.

A fast scarlet dyeing is obtained.

If in Example 22 the dyestuff compound used in the first paragraph is replaced by the compound listed in column II of the following Table I, and the dyestuff used in the third paragraph is replaced by that given in column III, then dyeings having the shades listed in column IV are obtained.

TABLE I

| Column I Example No. | Column II | Column III | Column IV |
|---|---|---|---|
| 23 | (structure shown) (See Example 22). | Dyestuff of Example 8 of U.S. patent specification No. 3,125,564. | Shade Olive. |
| 24 | Same as above | Dyestuff of Example 1 of U.S. patent specification No. 3,133,059. | Olive-green. |
| 25 | (structure shown) Prepared by condensation of the dyestuff described in Example 4 of U.S. patent specification No. 3,054,793 with p-aminophenylsulphamic acid as in Example 1. | Dyestuff of Example 1 of U.S. patent specification No. 2,892,828. | Orange. |
| 26 | Same as above | Dyestuff of Example 1 of U.S. patent specification No. 3,074,925. | Green. |

TABLE I—Continued

| Column I Example No. | Column II | Column III | Column IV |
|---|---|---|---|
| 27 | Same as Example 25 | Dyestuff of Example 1 of U.S. patent specification No. 2,892,828. | Orange. |
| 28 | [structure shown below] Prepared by condensation of the dyestuff described in Example 5 of U.S. patent specification No. 3,054,793 with p-aminophenylsulphamic acid as in Example 1. | Dyestuff If Example 1 of U.S. patent specification No. 2,892,829. | Do. |
| 29 | Same as above | Dyestuff of Example 2 of U.S. patent specification No. 3,133,059. | Green. |

Structure for Example 28:

HOOC—⌬(NO₂)—NH—⌬(SO₃Na)—N(CH₃)—C(=N—C(Cl)=N—C(NH—⌬—NHSO₃Na)=N)

EXAMPLE 30

100 parts of cotton limbric are immersed in a solution of 20 parts of the dyestuff obtained by the condensation of the dichlorotriazinyl dyestuff of Example 5 of U.S. patent specification No. 3,133,059 with an equimolar amount of p-aminophenylsulphamic acid as described in Example 1 of this specification, 30 parts of sodium carbonate and 100 parts of urea per 1000 parts of water at room temperature and is then squeezed between rollers to a total weight of 200 parts. The impregnated fabric is dried in warm air and then heated to a temperature of 140° C. for 3 minutes.

The fabric is immersed in water and washed at the boil in a 0.2% solution of detergent for 5 minutes, then treated at the boil in 0.4% solution of hydrochloric acid. The fabric is then rinsed in water, treated for 5 minutes at 80° C. in a 1% solution of sodium bicarbonate to remove residual acid and dried.

The fabric is then immersed in a neutral solution of 20 parts of the dyestuff described in Example 5 of U.S. patent specification No. 3,133,059 and 2.0 parts of a wetting agent in 1000 parts of water, squeezed between rollers to a total weight of 200 parts and stored for 2 hours at room temperature. The fabric is rinsed in water, washed at the boil in a 0.2% solution of detergent for 5 minutes and then dried.

A very strong greenish blue dyeing is obtained.

If in Example 30 the dyestuff compound used in the first paragraph is replaced by the compound listed in column II of the following Table II, and the dyestuff used in the third paragraph is replaced by that given in column III, then dyeings having the shades listed in column IV are obtained.

EXAMPLE 38

100 parts of cotton limbric are immersed in a solution of 20 parts of the copper complex of the dyestuff of the formula:

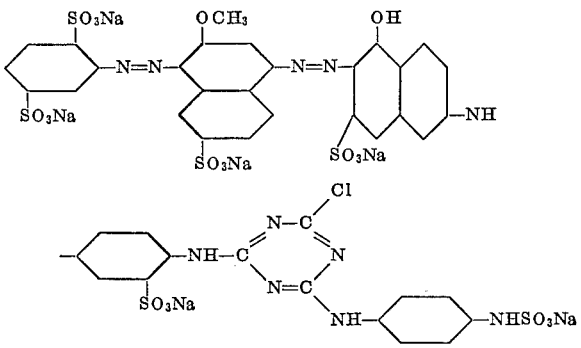

(prepared by the condensation of the corresponding dichorotriazinylamino dyestuff (see below) with an equimolar amount of p-aminophenylsulphamic acid as described in Example 1 of this specification), 20 parts of sodium carbonate and 100 parts of urea per 1000 parts of water, at room temperature and is then squeezed between rollers to a total weight of 200 parts. The impregnated fabric is dried in warm air and then heated to a temperature of 140° C. for 3 minutes.

The fabric is rinsed in water and washed at the boil in a 0.2% solution of detergent for 5 minutes, then treated at the boil in 0.4% solution of hydrochloric acid. The fabric is then rinsed in water, treated for 5 minutes at 80°

TABLE 2

| Column I Example No. | Column II | Column III | Column IV Shade |
|---|---|---|---|
| 31 | The condensation product of the dyestuff described in Example 2 of U.S. patent specification No. 3,133,059 and an equimolar amount of p-aminophenylsulphamic acid. | Dyestuff of Example 1 of U.S. patent specification No. 2,892,829. | Violet. |
| 32 | do | Dyestuff of Example 1 of U.S. patent specification No. 2,892,830. | Olive-green. |
| 33 | do | Dyestuff of Example 1 of U.S. patent specification No. 2,892,828. | Violet. |
| 34 | The condensation product of the dyestuff described in Example 4 of U.S. patent specification No. 3,133,059 and an equimolar amount of p-aminophenylsulphamic acid. | Dyestuff of Example 4 of U.S. patent specification No. 2,892,831. | Green. |
| 35 | do | Dyestuff of Example 4(a) of U.S. patent specification No. 2,892,831. | Do. |
| 36 | do | Dyestuff of Example 3 of U.S. patent specification No. 2,951,070. | Purple. |
| 37 | do | Dyestuff of Example 15 of U.S. patent specification No. 2,951,070. | Do. |

C. in a 1% solution of sodium bicarbonate to remove residual acid and dried.

The fabric is then immersed in a neutral solution of 20 parts of the dichlorotriazinyl dyestuff prepared as described below and 2 parts of a wetting agent in 1000 parts of water, squeezed between rollers to a total weight of 200 parts and stored for 2 hours at room temperature. The fabric is rinsed in water, washed at the boil in a 0.2% solution of detergent for 5 minutes and then dried.

A fast black dyeing is obtained.

The dichlorotriazinyl dyestuff which is used both for condensation with p-aminophenylsulphamic acid to give the compound having the structure set out in paragraph 1 of this example, and also for the dyeing stage described in paragraph 3, is obtained as follows:

Diazotised aniline-2,5-disulphonic acid is coupled with 2-methoxy-1-naphthylamine - 6 - sulphonic acid and the aminoazo compound so obtained is then diazotised and coupled with 2-(4'-amino - 3' - sulphophenylamino)-5-naphthol-7-sulphonic acid.

A mixture of 62.6 parts of the penta sodium salt of the above aminodisazo compound, 15 parts of copper sulphate pentahydrate, 27 parts of a concentrated aqueous solution of ammonia and 900 parts of water is stirred and heated at 95° C. for 20 hours. The mixture is cooled to 20° C., 50 parts of sodium chloride are added and the precipitated metal complex is filtered off and dried. A solution of 22 parts of this metal complex in 250 parts of water is added with stirring to a suspension of 4 parts of cyanuric chloride in a mixture of 50 parts of acetone, 50 parts of water and 100 parts of ice, the temperature of the resulting mixture being maintained between 0° and 5° C. by external cooling. The mixture is stirred at this temperature for 2 hours and 14 parts of a 10% aqueous sodium carbonate solution are then added. 9 parts of sodium diethylmetanilate, 1 part of sodium hydrogen sulphate and 60 parts of sodium chloride are then added and the precipitated dyestuff is filtered off and washed with 200 parts of acetone. The dyestuff paste so obtained is mixed with 1.8 parts of sodium diethylmetanilate and 0.2 part of sodium hydrogen sulphate and dried at 20° C.

EXAMPLE 39

If in Example 38 the 20 parts of the copper complex of the dyestuff having the structure set out in the first paragraph are replaced by 20 parts of the copper complex of the dyestuff having the formula:

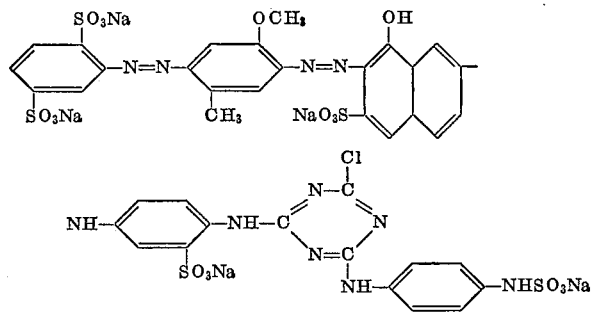

the remaining details of the example being unchanged, then a strong, fast black dyeing is obtained.

The dyestuff having the above structure is prepared by the condensation of the corresponding dichlorotriazinylamine dyestuff (preparation described below) with an equimolecular amount of p-aminophenylsulphamic acid as described in Example 1.

The dichlorotriazinyl dyestuff is obtained by a process identical with that described in the final paragraph of Example 38, except that the 62.6 parts of the pentasodium salt of the aminodisazo compound are replaced by an equivalent amount of tetrasodium salt of the aminodisazo compound obtained by diazotising aniline-2,5-disulphonic acid, coupling with 2-methoxy-5-methylaniline, diazotising the aminoazo compound so obtained and coupling it with 2 - (4' - amino - 3' - sulphophenylamino)-8-naphthol-6-sulphonic acid.

The dyestuff of Example 1 of U.S. Pat. 1,667,312 is prepared as follows:

46.7 parts of the primary product of condensation obtained from one molecular proportion of cyanuric chloride and one molecular proportion of 1:8-aminonaphthol-3:6 disulphonic acid are dissolved in 350 parts of water with aid of 15 parts of anhydrous sodium carbonate; to the solution are added in succession ice and a diazobenzene solution prepared from 9.3 parts of aniline. The dyestuff thus formed correspond most probably with the formula

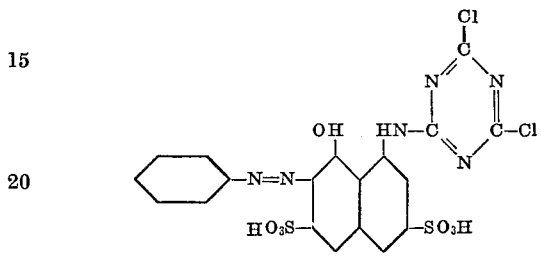

The dyestuff of Example 17 of U.S. Pat. 3,038,893 is prepared from an aminodisazo obtained by diazotizing aniline-2:5-disulphonic acid, coupling with 2-methoxy-5-methylaniline and the resulting aminoazo compound is diazotized and coupled under alkaline condition with an equimolecular proportion of 2-amino-5-naphthol 1:7-disulphonic acid.

A mixture of 18 parts of the trisodium salt of the above amino-diazo compound, 400 parts of water, 10 parts of diethanolamine, 30 parts of a 2 N aqueous solution of copper sulphate and 15 parts of a concentrated aqueous solution of ammonia is stirred at a temperature between 95° and 100° C. for 15 hours. 40 parts of sodium chloride are then added and the precipitated metal compound is filtered off and dried. A solution of 21 parts of this metal compound in 200 parts of water is added with stirring to a suspension of 5.2 parts of cyanuric chloride in a mixture of 50 parts of acetone, 100 parts of ice and 50 parts of water, the temperature being maintained between 0° and 5° C., by external cooling. The mixture is stirred for 1 hour and 11 parts of a 10% aqueous solution of sodium carbonate are then added. 9 parts of sodium diethylmetanilate, 1 part of sodium hydrogen sulphate and 15 parts of sodium chloride are then added and the precipitated dyestuff is filtered off. The dyestuff paste is then washed with 400 parts of acetone and the paste mixed with 1.8 parts of sodium diethyl metanilate and 0.2 part of sodium hydrogen sulphate and dried at 20° C.

The dyestuff of Example 3 of U.S. Patent 2,892,831 and used in Example 2 herein is prepared as follows:

A neutral solution in 1400 parts of water of 54.9 parts of the trisodium salt of the aminoazo compound obtained by reducing with sodium sulphide, the monoazo compound obtained by coupling diazotized 4-nitro-aniline-2-sulphonic acid with 1-(4'-sulphophenyl-3-carboxy-5-pyrazolone is added gradually in a period of 40 minutes to a suspension formed by pouring a solution of 19.2 parts of cyanuric chloride in 100 parts of acetone into a stirred mixture of 300 parts of water and 300 parts of crushed ice. The temperature of the mixture is kept below 3° C. and after the addition of the solution of aminoazo compound is complete, the mixture is stirred for 15 minutes. To isolate the resulting product, the mixture is then neutralized by adding a solution of 5.3 parts of sodium carbonate in 50 parts of water during about 20 minutes at such a rate that the aqueous medium does not become alkaline to litmus at any time. The mixture is then stirred for another 30 minutes and salt is then added at the rate of 1 lb. for each gallon of solution. The mixture is stirred for 1 hour and filtered and the residue on the filter is washed with 10% aqueous sodium chloride solution, drained well and then mixed with 4.2 parts of disodium hydrogen phosphate and 7.6 parts of potassium dihydrogen phosphate and dried at 25° C.

The dyestuff of Example 4 of U.S. Patent 2,892,831 is prepared as follows:

A solution of 18.8 parts of cyanuric chloride in 100 parts of acetone is poured into a stirred mixture of 600 parts of water and 600 parts of crushed ice and to the suspension so formed there is added during a period of 40 minutes a solution in 1000 parts of water of 53.1 parts of the disodium salt of the aminoazo compound found by coupling diazotized 5-acetylaminoaniline-2-sulphonic acid with 1-(2'-chloro-5'-sulphophenyl)-3-methyl-5-pyrazolone and hydrolyzing the monoazo product in boiling dilute hydrochloric acid. The reaction mixture is stirred for a short period of time keeping the temperature below 5° C. and the acidity which has developed in the reaction medium is neutralized to litmus by careful addition of a solution of sodium carbonate. Sodium chloride is then added at the rate of 10 lbs. for every 10 gallons of reaction mixture and then there is added a solution containing 7 parts of anhydrous disodium hydrogen phosphate and 12.5 parts of anhydrous potassium dihydrogen phosphate in 100 parts of water. The mixture is stirred for another 30 minutes and the residue on the filter is mixed thoroughly with 4.2 parts of anhydrous disodium hydrogen phosphate and 7.6 parts of anhydrous potassium dihydrogen phosphate and then dried at 30° C.

The dyestuff so obtained is a greenish yellow solid which gives greenish yellow solutions in water.

The dyestuff of Example 1 of U.S. Patent 2,892,829 is prepared as follows:

A solution of 18.5 parts of cyanuric chloride in 100 parts of acetone is poured into a stirred mixture of 300 parts of water and 300 parts of crushed ice, and 2 parts of 2 N hydrochloric acid are added. To the suspension of cyanuric chloride thus obtained there is added during 1 hour a solution of 36.3 parts of the disodium salt of 1-amino-8-naphthol-3:6 disulphonic acid, in 160 parts of water, which has been made faintly alkaline to Brilliant Yellow by the addition of aqueous sodium carbonate solution, the temperature of the mixture during and subsequent to the addition being kept below 5° C. The reaction mixture is stirred until no unchanged 1-amino-8-naphthol-3:6 disulphonic acid remains in the resulting solution.

A suspension of the diazo compound from 16.45 parts of aniline-2-sulphonic acid, obtained by diazotizing a mixture of the aniline-2-sulphonic acid in 200 parts of water and 22 parts of hydrochloric acid (density 1.18) at a temperature between 0° and 2° C. with 6.55 parts of sodium nitrite is added to the mixture during 5 minutes while the temperature of the mixture is maintained between 0° and 5° C. 50 parts of sodium acetate crystals are then added during 10 minutes to the mixture, which is then stirred for about 20 hours at a temperature between 0° and 4° C. after which time sufficient anhydrous sodium carbonate is added to render the aqueous medium slightly alkaline to litmus. Sufficient sodium chloride to give a concentration of 200 grams per liter is added and the mixture is stirred for 30 minutes and then filtered. The solid on the filter is washed with 20% aqueous sodium chloride solution and dried at 20 to 45° C. The product forms a bluish-red powder which dissolves in water to give a yellowish-red solution and in concentrated sulphuric acid to give a reddish-violet solution. This dyestuff has, in the form of its free acid, the formula:

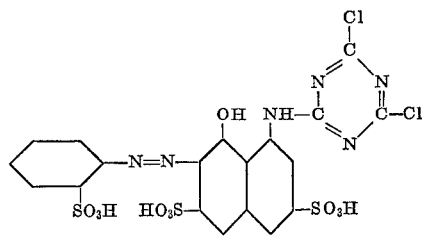

The dyestuff of Example 8 of U.S. Patent 3,125,564 is prepared as follows:

A solution of 5 parts of cyanuric chloride in 24 parts of acetone is added gradually to a stirred mixture of 100 parts of water and 100 parts of crushed ice. The suspension of cyanuric chloride so obtained is stirred at a temperature between 0° C. and 4° C. and a solution of 13.33 parts of the disodium salt of 1 - amino - 4 - (3'-aminoanilino) - anthraquinone - 2:4' - disulphonic acid in 300 parts of water is added over 1 hour. The mixture is stirred for a further 1 hour and then sufficient 10% sodium carbonate solution is added gradually to render the reaction mixture neutral to litmus. A solution of 6 parts of anhydrous disodium hydrogen phosphate and 12 parts of anhydrous potassium dihydrogen phosphate in 100 parts of water is added to the mixture, and after stirring for 10 minutes sufficient sodium chloride is added to give a concentration of 200 grams per liter of solution. The mixture is stirred for 1 hour and is then filtered. The solid residue is washed with a solution of 80 parts of sodium chloride, 6 parts of anhydrous disodium hydrogen phosphate and 12 parts of anhydrous potassium dihydrogen phosphate in 400 parts of water and is dried at atmospheric temperature. The dyestuff so obtained is mixed intimately with a mixture of 1 part of anhydrous disodium hydrogen phosphate and 2 parts of anhydrous potassium dihydrogen phosphate.

The dyestuff of Example 1 of U.S. Pat. 3,133,059 is prepared as follows:

56.8 parts of copper phthalocyanine-N-(4-amino-3-sulfophenyl) - sulfonamide - sulfonic acid are dissolved in 3000 parts of water and sufficient 2 N aqueous sodium carbonate solution to give a solution of pH 7 and the solution is added dropwise, during 30 minutes to a stirred suspension of 20 parts of cyanuric chloride (prepared by dissolving the latter in 80 parts of acetone and drowning the solution in 300 parts of ice-water), while the temperature is maintained between 0° C. and 10° C. by cooling in an ice-bath. The mixture is stirred for 3 hours, then filtered. The filtrate is adjusted to pH 7 by the addition of 2 N aqueous sodium carbonate solution, and is then diluted to a total of 5000 parts. A solution of 60 parts of disodium hydrogen phosphate and 120 parts of potassium dihydrogen phosphate in 1000 parts of water is added, followed by 1000 parts of sodium chloride and the precipitated dyestuff is filtered off, washed with a solution of 500 parts of sodium chloride, 30 parts of disodium hydrogen phosphate and 60 parts of potassium dihydrogen phosphate in 2400 parts of water and dried.

The dyestuff of Example 3 of U.S. Pat. 2,892,831 and used in Example 11 herein in prepared as follows:

A neutral solution in 1400 parts of water of 49.6 parts of the disodium salt of the aminoazo compound obtained by reducing with sodium sulphide the monoazo compound obtained by coupling diazotized 4-nitro-aniline-2-sulphonic acid with 1-(2'-sulphophenyl) - 3 - methyl-5-pyrazolone is added gradually in a period of 40 minutes to a suspension formed by pouring a solution of 19.2 parts of cyanuric chloride in 100 parts of acetone into a stirred mixture of 300 parts of water and 300 parts of crushed ice. The temperature of the mixture is kept below 3° C. and after the addition of the solution of aminoazo compound is complete, the mixture is stirred for 15 minutes. to isolate the resulting product, the mixture is then neutralized by adding a solution of 5.3 parts of sodium carbonate in 50 parts of water during about 20 minutes at such a rate that the aqueous medium does not become alkaline to litmus at any time. The mixture is then stirred for another 30 minutes and salt is then added at the rate of 1 lb. for each gallon of solution. The mixture is stirred for 1 hour and filtered and the residue on the filter is washed with 10% aqueous sodium chloride solution, drained well and then mixed with 4.2 parts of disodium hydrogen phosphate and 7.6 parts of potassium dihydrogen phosphate and dried at 25° C.

The dyestuff of Example 1 of U.S. Pat. 2,892,828 is prepared as follows:

A solution of 18.5 parts of cyanuric chloride in 100 parts of acetone is poured into a stirred mixture of 400 parts of water and 400 parts of crushed ice, and 2 parts of 2 N hydrochloric acid are added. To the suspension of cyanuric chloride thus obtained there are added during 40 minutes, and at a temperature below 5° C., 26.1 parts of the sodium salt of 2-amino - 5 - naphthol-7-sulphonic acid as a solution in 480 parts of water, made faintly alkaline to Brilliant Yellow by the addition of sodium carbonate. The mixture is stirred at a temperature below 5° C. for 1 hour and then 6 parts of 2 N sodium carbonate solution are added and stirring is continued at the same temperature for another 20 minutes. A suspension of the diazo compound from 16.45 parts of aniline-2-sulphonic acid, obtained by diazotizing the aniline-2-sulphonic acid is a mixture of 200 parts of water and 18 parts of hydrochloric acid (specific gravity 1.18) at a temperature between 0° and 2° C. with 6.55 parts of sodium nitrite, is then added to the mixture during 5 minutes at a temperature between 0° and 4° C. 40 parts of sodium acetate crystals are added during 10 minutes and the mixture is stirred at 0° to 4° C. for 90 minutes, after which time sufficient anhydrous sodium carbonate is gradually added during a further 90 minutes to render the aqueous medium slightly alkaline to litmus. Sufficient sodium chloride to give a concentration of 200 grams per liter is added and the mixture is stirred for 30 minutes, while the temperature is maintained between 0° and 4° C., and the mixture is filtered, and the solid on the filter is washed with 20% brine and then with acetone and dried at 20° to 45° C. The product forms a red-brown solid which dissolves in water to give an orange solution and in concentrated sulphuric acid to give a bluish red solution.

This product in the form of its free acid has the formula:

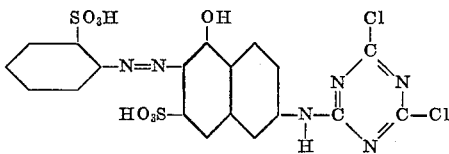

The dyestuff of Example 1 of U.S. Pat. 2,892,830 is prepared as follows:

A solution of 18.5 parts of cyanuric chloride in 105 parts of acetone is poured into a stirred mixture of 250 parts of water and 250 parts of ice, at a temperature below 5° C. A solution in 500 parts of water at 30° C. of 46.5 parts of the disodium salt of the compound obtained by diazotizing 2-naphthylamine-4:8-disulphonic acid and coupling the diazo compound thus formed with m-toluidine is added during 75 minutes to the aqueous suspension of cyanuric chloride obtained as described above. The mixture is stirred for a further 20 minutes and then a 2 N aqueous solution of sodium carbonate is added during 30 minutes at such a rate that the mixture is maintained slightly acid to litmus. At the end of this time the mixture is rendered slightly alkaline to litmus by the addition of more sodium carbonate solution. 140 parts of sodium chloride are added, and the mixture is stirred for 30 minutes, and is then filtered and the solid residue is washed with 10% brine and dried at 20–45° C.

The product dissolves in water with a reddish-orange coloration and dissolves in concentrated sulphuric acid with a red coloration.

The dyestuff of Example 1 of U.S. Pat. 3,157,630 is prepared as follows:

2-aminophenol-4-sulphonic acid is diazotized and coupled with an alkaline solution of 1-amino-8-naphthol-3:6-disulphonic acid, and the aminoazo compound obtained is converted to the copper complex by boiling with an aqueous solution of copper sulphate containing a little acetic acid.

Sufficient of the copper complex so obtained to contain 59.95 parts of the aminoazo compound is dissolved in water and the solution is added to a suspension of 18.4 parts of cyanuric chloride in ice-cold water. The mixture is stirred for 2 hours at from 0 to 5° C., sodium carbonate being added at intervals to neutralize the mixture to litmus.

Sodium chloride is then added at the rate of 100 parts for each 1000 parts of reaction mixture and the product which separates is filtered off and dried. It contains 1.96 atoms of organically bound chlorine for each azo group and consists substantially of the dichlorotriazinyl derivative of the copper-containing aminoazo compound used as starting material.

The dyestuff of Example 23 of U.S. Pat. 3,157,630 is prepared in essentially the same manner as the dyestuff disclosed in Example 1, therein, given above, except that the diazo component is 2-aminophenol-4-sulphonic acid and the coupling component is 2-amino-5-naphthol-1:7-disulphonic acid.

The dyestuff of Example 1 of U.S. Pat. 3,054,793 is prepared as follows:

19.45 parts of 2-nitro-4'-amino-diphenylamine-3':4-disulfonic acid are dissolved in 300 parts of water containing 50 parts of 2 N sodium carbonate solution, and the resulting solution is added to a stirred suspension of cyanuric chloride (prepared by dissolving 9.25 parts of the latter in 40 parts of acetone and drowning the solution into 150 parts of ice-water). The mixture is stirred at a temperature between 0° C. and 5° C. and adjusted to pH 7, at short intervals, by the addition of 2 N sodium carbonate solution. The reaction is complete when a clear solution is formed. 100 parts of a solution containing 6 parts of disodium hydrogen phosphate and 12 parts of potassium dihydrogen phosphate in 82 parts of water are added. 100 parts of sodium chloride are added and the mixture is stirred for a short time, filtered and the residue is dried at room temperature. The product contains 41% of inorganic matter and 7.27% of organically combined chlorine (the dichlorotriazinyl derivative of the starting material (at 59% purity) contains 7.21% of chlorine).

The orange-red product dyes wool and cotton in orange shades of high fastness to light and wet treatments.

The 2-nitro - 4' - aminodiphenylamine-3':4-disulfonic acid used as starting material in the above example may be obtained by interaction of equimolar amounts of p-phenylene-diamine-2-sulfonic acid and 4-chloro-3-nitrobenzenesulfonic acid in aqueous solution at the boil in the presence of calcium carbonate. The resulting mixture is made alkaline to litmus with sodium carbonate, filtered and the filtrate is made acid to Congo Red with 35% aqueous hydrochloric acid. The greenish yellow precipitate is filtered off, washed with 2 N hydrochloric acid and dried.

The dyestuff of Example 1 of U.S. Pat. 3,074,925 is prepared as follows:

A solution of 4.06 parts of cyanuric chloride in 20 parts of acetone is added gradually to a stirred mixture of 50 parts of water and 100 parts of crushed ice. To the stirred suspension of cyanuric chloride thus obtained there is added 0° to 4° C. during 1 hour a solution in 250 parts of water of 14.8 parts of the trisodium salt of 1-amino-4 - [4' - (4" - aminophenylazo)-aniline]-anthraquinone-2:2":5-trisulphonic acid, which may be prepared by condensing 4 - bromo-1-aminoanthraquinone-2:5-disulphonic acid with 4:4'-diaminoazobenzene-2-sulphonic acid in alkaline medium. The mixture is stirred for a further 40 minutes at 0°–4° C. and then sufficient 2 N sodium carbonate solution is added gradually during 30 minutes to render the reaction mixture neutral to litmus. A solution of 11.4 parts of disodium hydrogen phosphate and 7.2 parts of potassium dihydrogen phosphate in 100 parts of water is added, the mixture is stirred for 10 minutes and then sufficient sodium chloride to give a concentration of 50 grams per liter is added and the mixture is stirred for 3 hours when separation of the dyestuff is complete. The mixture is filtered, and the solid on the filter is washed with a solution of 25 parts of sodium chloride, 11.4 parts of disodium hydrogen phosphate and 7.2 parts of potassium dihydrogen phosphate in 500 parts of water, and finally dried at atmospheric temperature. The product so obtained has the formula:

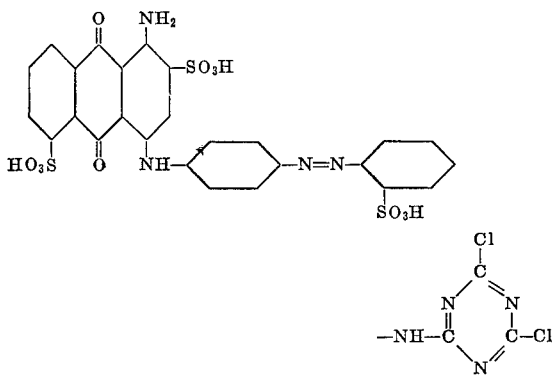

The dyestuff of Example 2 of U.S. Pat. 3,133,059 is prepared as follows:

13.6 parts of copper phthalocyanine-N-(4-β-hydroxyethylamino-3-sulfophenyl)-sulfonamide-sulfonic acid are dissolved in 600 parts of water containing sufficient 2 N aqueous sodium carbonate solution to give a solution of pH 7 and the solution is added to an aqueous acetone suspension of 4.2 parts of cyanuric chloride (obtained from a solution of the latter in 20 parts of acetone by drowning into 200 parts of ice-water), and the mixture is stirred, maintaining the temperature at 0–5° C. by cooling in an ice-bath. The pH of the mixture is maintained at 7 by frequent additions of 2 N aqueous sodium carbonate solution until the reaction is complete. A solution of 12 parts of disodium hydrogen phosphate and 24 parts of potassium dihydrogen phosphate in 164 parts of water is added, followed by 600 parts of sodium chloride and the precipitate is filtered off, washed with a solution of 50 parts of sodium chloride, 3 parts of sodium hydrogen phosphate and 6 parts of potassium dihydrogen phosphate in 240 parts of water and dried.

The dyestuff of Example 5 of U.S. Pat. 3,133,059 is prepared as follows:

60 parts of copper 4-p-aminobenzoyl phthalocyanine-3-sulfonic acid are dissolved in 3000 parts of water and sufficient 2 N aqueous sodium hydroxide solution to give a solution of pH 7. The solution is added to a stirred suspension of 40 parts of cyanuric chloride (prepared by dissolving the latter in 200 parts of acetone and drowning the solution in 2000 parts of ice-water and 2000 parts of crushed ice). 2 N aqueous sodium carbonate solution is added dropwise to the stirred mixture to maintain the pH just below 7, while the temperature is maintained between 0° C. and 5° C. by cooling in an ice-bath. When the pH of the mixture remains steady just below 7, addition of sodium carbonate solution is stopped and a solution of 6 parts of disodium hydrogen phosphate and 12 parts of potassium dihydrogen phosphate in 100 parts of water is added, followed by 2100 parts of sodium chloride. The precipitate is separated by filtration, washed with a solution of 50 parts of sodium chloride, 3 parts of disodium hydrogen phosphate and 6 parts of potassium dihydrogen phosphate in 240 parts of water and dried.

The dyestuff of Example 4 of U.S. Pat. 2,892,831 used in Example 34 of this application is prepared in accordance with part (d) of said patent by using in place of the aminoazo compound in Example 4 of the patent an equivalent molecular amount of the disodium salt of the aminoazo compound obtained by hydrolysis of the product formed by coupling 5-acetylamino-aniline-2-sulphonic acid with 1-(2'-sulphophenyl)-3-methyl-5-pyrazolone.

The dyestuff of Example 4(a) of U.S. Pat. 2,892,831 is prepared essentially as the dyestuff of Example 4 of this patent except that in place of the aminoazo compound used in Example 4, there is used an equivalent molecular amount of the disodium salt of the aminoazo compound obtained by hydrolysis of the product formed by coupling 5-acetylamino-aniline-2-sulphonic acid with 1-(4'-sulphophenyl)-3-carboxy-5-pyrazolone.

The dyestuff of Example 3 of U.S. Pat. 2,951,070 is prepared as follows, 19.2 parts of cyanuric chloride was dissolved in 160 parts of acetone and the solution is added to a well stirred mixture of 800 parts of ice and 600 parts of water. 61.9 parts of the trisodium salt of the aminoazo compound obtained by coupling diazotized 2-naphthylamine-3:6-disulphonic acid under alkaline conditions with 1-amino-8-naphthol-3:6-disulphonic acid are dissolved in 1600 parts of water. This solution is neutralized to litmus and added during 50 minutes to the suspension of cyanuric chloride. The temperature of the mixture is kept below 3° C. and the mixture is stirred until no unchanged aminoazo compound can be detected. The mixture is then neutralized to litmus by the addition of approximately 50 parts of 2 normal sodium carbonate solution.

40 parts of a 1.8:1 mixture of potassium dihydrogen phosphate and disodium hydrogen phosphate are dissolved in 200 parts of water and added to the reaction mixture. Salt is then added at the rate of 15 parts of salt for every 100 parts of reaction mixture. The mixture is stirred for 30 minutes and filtered. The product on the filter is mixed with 12 parts of a 1.8:1 mixture of potassium dihydrogen phosphate and disodium hydrogen phosphate and the mixture is then washed with acetone and dried at room temperature.

The dyestuff of Example 15 of U.S. Pat. 2,951,070 is prepared as above except that the diazo component used is 2-naphthylamine 1:5:7-trisulphonic acid.

We claim:

1. Process for the colouration of cellulose textile material wherein the material is treated with a first chloro-s-triazine group-containing reactive dyestuff containing an aromatic nucleus bearing a free amino group or a sulphamic acid group in the form of its alkali metal salt to introduce primary amino groups chemically linked to the cellulose molecule and is then subjected to the action of an aqueous sodium containing a second reactive dyestuff.

2. A process as claimed in claim 1 wherein introduction of the primary amino groups is carried out by treatment of the cellulose with said first chloro-s-triazine dyestuff containing an aromatic nucleus bearing a sulphamic acid group in the form of its alkali metal salt, fixing the compound in the cellulose molecule by treatment with an acid-binding agent, and thereafter treating the cellulose material with dilute acid whereby the NHSO$_3$H groups are converted to NH$_2$ groups.

3. A process as claimed in claim 1 wherein the subjection of the textile material to the action of an aqueous medium containing said second reactive dyestuff is effected by treatment with an aqueous solution of the dyestuff without the co-use of an alkaline agent to fix the reactive dyestuff on the fibre.

References Cited

UNITED STATES PATENTS 2,892,830   6/1959   Stephen _____ 8—1 E

OTHER REFERENCES

W. Badertscher: Amer. Dyestuff Reporter, Jan. 7, 1963, pp. P23–P27.

B. C. M. Dorset: The Textile Manufacturer, December 1964, pp. 511–516.

GEORGE F. LESMES, Primary Examiner

T. J. HERBERT JR., Assistant Examiner

U.S. Cl. X.R.

8—26, 54.2, 1 E